3,618,227
PARTICLE DRYING APPARATUS
James Harry Breakell, Swarthmore, and Edwin L. Nicholson, Springfield, Pa., assignors to FMC Corporation, Philadelphia, Pa.
Filed Mar. 26, 1970, Ser. No. 22,950
Int. Cl. F26b 3/16
U.S. Cl. 34—164          6 Claims

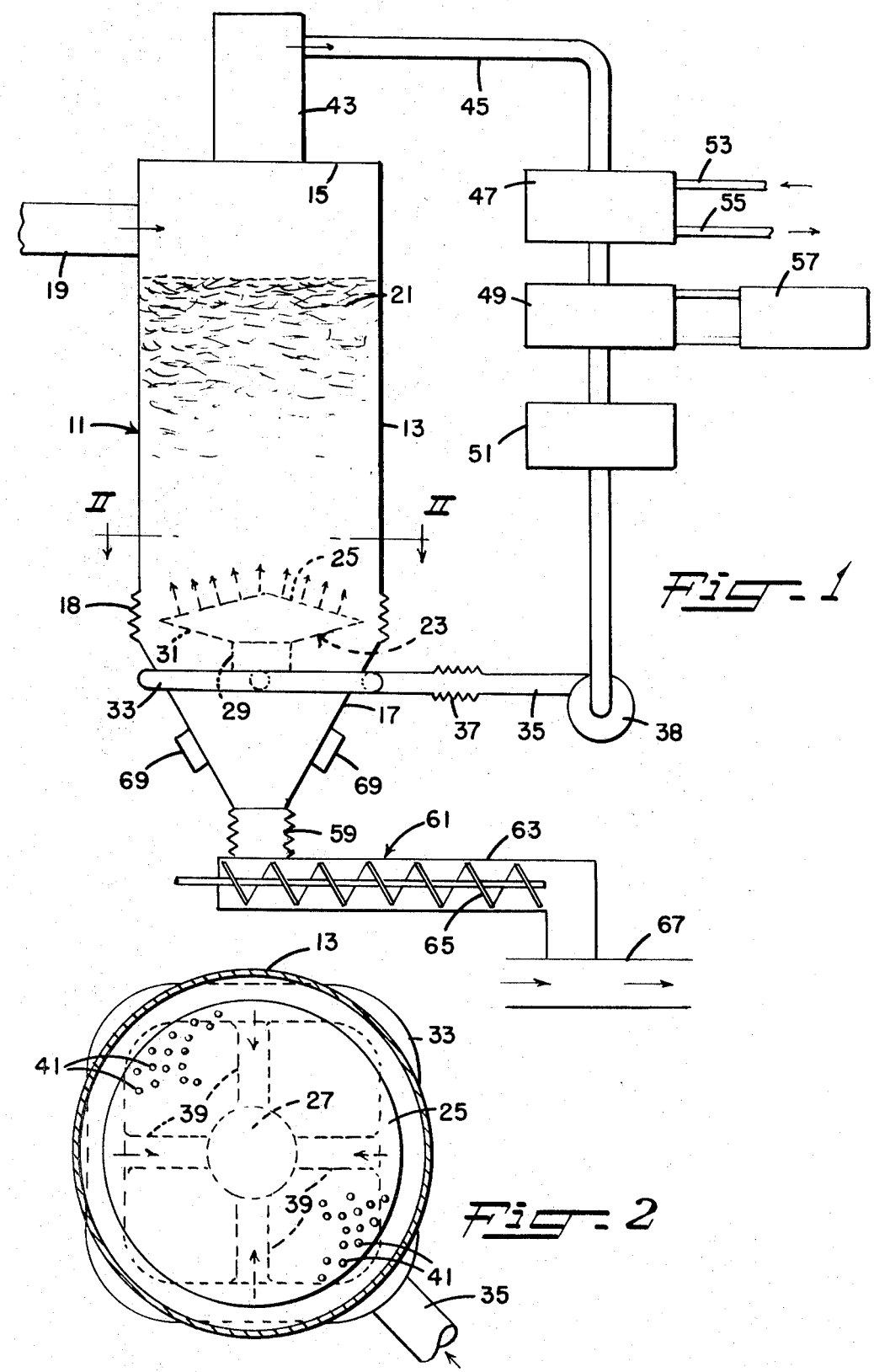

ABSTRACT OF THE DISCLOSURE

Apparatus for continuous drying of particles as they move through a tank by gravity and counter-current to a flow of heated, dry gas delivered under pressure through a distributor positioned within the tank, in spaced relationship with the walls thereof. The distributor has a conical, perforated top wall which facilitates the free flow of particles relative thereto and distributes the heated, dray gas as a plurality of diverging streams. Means are provided for vibrating the lowermost end of the tank, including the gas distributor, to minimize bridging of particles between the tank and the gas distributor.

---

The present invention is directed to an apparatus for continuous drying of moisture-containing particles, and particularly flakes, pellets, or chips of polyesters.

Once polymerized, polyesters which may be formed into orientable films and fibers, such as polyethylene terephthalate, are extruded in the form of ribbons or filaments, quenched by water and comminuted into particles, as for example, pellets, chips or flakes. These polyester particles are then dried, as by a heated inert gas, and generally stored until subsequent melting and extrusion into the form of films and fibers. Intensive drying of the polyester particles and the maintenance of such particles in a dry condition prior to final extrusion, as within storage and extrusion surge tanks, is essential to avoid hydrolysis of the polyester. For example, polyethylene terephthalate must contain less than 0.01%, by weight, moisture for proper extrusion thereof.

In the manufacture of such shaped films and fibers there results considerable amounts of scrap polyester, as for example film edge trim. Various proposals have been made for the economic recovery of such scrap polyester which, in general, involve comminution of the scrap polyester into particles and intensive drying of such particles.

Drying of polyester particles is generally achieved by a batch process. Such process is slow and costly and, when taken with the necessary desiccant dryers, storage and surge tanks which are required for providing and maintaining polyester particles of desired dryness, involves considerable capital investments. Accordingly, a primary object is the provision of a new or improved and more satisfactory apparatus for drying polyester particles.

Another object is to provide an apparatus for drying polyester particles by a continuous process.

Still another object of this invention is an apparatus which facilitates continuous drying of polyester particles and transfer of such dried particles to an extrusion apparatus.

A further object is the provision of an apparatus for continuous drying of polyester particles which provides savings in space and capital investments.

These objects are accomplished in accordance with the present invention by an apparatus which includes a vertically disposed, closed tank having a discharge hopper at its lowermost end, means in the vicinity of the uppermost end of the tank for delivering polyester particles, as for example in the form of pellets or chips, and a gas distributor positioned within the tank adjacent to the discharge hopper and in spaced relationship with the walls defining the same. Means are provided for delivering a heated, dry gas under pressure into the distributor, which gas passes through a conical, perforated top wall thereof, flows upwardly through the tank, and is removed therefrom by exhaust means located in the vicinity of the uppermost end thereof. This upward flow of gas is counter-current to the passage of the polyester particles which move, by gravity, toward the discharge hopper.

The conical top wall of the gas distributor encourages the flow of the polyester particles relative to the distributor itself and toward the discharge hopper. Preferably, means are also provided for vibrating the discharge hopper and gas distributor to further minimize any tendency for the polyester particles to bridge between the gas distributor and the inside surfaces of the tank.

To insure a uniform flow of the heated, dry gas from the gas distributor, the gas is supplied to a manifold which encircles the tank and, from such manifold, is delivered into the distributor at a plurality of substantially equally spaced locations. In addition, the perforations in the distributor top wall are formed with their axes substantially perpendicular to the conical surface thereof so that the streams issuing therefrom are directed along diverging paths and distribute the gas along all areas of the tank above such distributor.

Desirably, the spent gas exhausted from the tank is re-used and thus the apparatus also includes a recirculating system located outwardly of the tank which includes an air filter for separating particles from the gas, a cooler for chilling such spent gas, a dryer for removing moisture from the cooled gas and a heater for again heating the gas to a require elevated temperature. A conventional desiccant gas dryer, cooler and heater are employed in this recirculation system.

As noted above the apparatus of the present invention is intended for use in continuous drying operations of polyester particles. Thus, the discharge hopper is connected to an enclosed conveyor, as for example, an extruder, so that the polyester particles, once dried, may be directly shaped into desired films or filaments. This connection between the discharge hopper and enclosed conveyor is preferably an air-tight flexible conduit which, of course, shields the dried particles from the atmosphere outwardly of the apparatus, yet permits the discharge hopper to be vibrated.

The tank employed in the apparatus of the present invention may serve also as a conventional surge tank and, in view of the continuous particle drying which such apparatus provides, the need for storage tanks is at least minimized. In the gas recirculation system, a conventional air filter, cooler, heater and desiccant dryers are employed. The cooler and desiccant dryer and heater must together be capable of providing the gas with a low dew point and a temperature of perhaps 300° to 325° F. when employed with polyethylene terephthalate particles.

The particular gas employed must, of course, be inert relative to the polyester particles and may include air, carbon dioxide, nitrogen, etc., with air being preferred from the standpoint of economy. Preferably, the drying gas is delivered into the tank at a velocity which is only slightly less than that which would cause "blow holes" to occur within the mass of polyester particles within the tank.

The apparatus of the present invention is particularly useful with scrap polyester and is hereafter described as employed with scrap polyethylene terephthalate. Such scrap may be comminuted into the form of pellets or flakes, conveyed by air, separated, as in a cyclone, and then delivered into the apparatus of the present invention.

In the drawing:

FIG. 1 is a diagrammatic illustration of the apparatus of the present invention; and FIG. 2 is a horizontal section taken along the line II—II of FIG. 1.

The apparatus illustrated includes a vertically disposed closed tank 11 having an annular wall 13, top wall 15 and a discharge hopper or funnel-shaped bottom wall 17. For reasons as hereafter described, a flexible but airtight connection 18 is provided between the tank wall 13 and hopper 17. A conduit 19 opens into the tank 17 adjacent to its top wall 15 for delivering polyethylene terephthalate pellets or chips, which are indicated at 21.

Positioned within the tank 11, adjacent to the discharge hopper 17 and in spaced relationship with the walls thereof, is a gas distributor 23. This distributor 23 is in the form of a chamber having a conical, perforated top wall 25 of circular configuration, a bottom wall 27 which is also of circular shape but of substantially smaller diameter than the top wall 25, and annular and tapered side walls 29 and 31, respectively. While the gas distributor 23 need not be of the exact construction as described above, the gas distributor employed should be of reduced dimensions in the area below the perforated top wall to permit the free flow of particles relative thereto.

Encircling the discharge hopper 17 is a manifold 33 into which heated air having a low dew point is delivered by means of a conduit 35, having a flexible but air-tight section 37, and pump 38. A plurality of conduits 39 extend from the manifold 33, through the wall of the hopper 17, and open into the gas distributor 23 at substantially equal spaced locations thereof. With this arrangement, pressure differences exerted by the heated, dry gas within the distributor 23 are at least minimized.

As best seen in FIG. 2, perforations 41 are provided in the top wall 25 of the gas distributor 23. These perforations 41 are smaller in size than the particles which are to be treated and are arranged at spaced intervals along a series of concentric circles, with the perforations in each of such circles being staggered relative to the perforations in adjacent circles. The axes of the perforations preferably extend perpendicular to conical surfaces of the top wall 23. The streams of gas issuing from such perforations 41 thus flow along diverging paths so as to spread throughout the portion of the tank above the distributor 23, as indicated by broken arrows in FIG. 1. Satisfactory results have been achieved by employing a gas distributor having from 4 to 6% of its top wall perforated.

The dry, heated gas discharged from the distributor 23 flows upwardly; that is, counter-current to the gravitational movement of the column of polyethylene terephthalate particles 21, and is removed from the upper end of the tank 11 through an exhaust conduit 43 which includes an air filter for separating air borne particles and returning the same back into the tank.

Preferably, but not necessarily, the spent gas removed from the tank 11 is conveyed by a conduit 45 sequentially to a cooler 47, desiccant dryer 49, heater 51 and back to the delivery pump 38. The cooler 47, having cooling fluid conduits 53 and 55, the desiccant dryer 49, which includes a desiccant regenerator 57, and the heater 51 are of conventional construction.

From the hopper 17, the dried polyethylene terephthalate particles pass through a flexible, air-tight conduit or sleeve 59 and into an enclosed conveyor 61 which, as illustrated, includes a barrel 63 and screw 65. The conveyor acts as an air lock which prevents the atmosphere outwardly of the apparatus from entering into the tank 11 as well as stopping drying gas, which is under high pressure, from blowing out through conveyor, while moving the dried particles toward a pipe 67 through which they may be further carried, by hot dry air, to storage tanks or extruders.

The conical top wall 25 of the gas distributor 23 encourage the dried polyethylene terephthalate particles to flow into the discharge hopper 17. Preferably, at least one and desirably a series of vibrators 69 are provided to shake or agitate the discharge hopper 17. The flexible connections 18 and 59 between the hopper 17 and the tank wall 13 and conveyor 61, together with the flexible section 37 in the conduit 35 facilitate the desired vibration of the hopper 17 and, equally important, permit the gas distributor 23 and manifold 33 to vibrate with such hopper 17. With this arrangement, bridging of particles 21 between the gas distributor 23 and the tank walls, as might normally require a shut-down of the apparatus, is completely avoided.

In the operation of the above-described apparatus, polyethylene terephthalate particles, in the form of pellets or chips 21, are delivered through conduit 19 into the tank 11. Air having a low point and having a temperature of from about 300° to 325° F. is delivered by the pump 38 through the conduit 35, manifold 33, conduits 39 and into the gas distributor 23. This dry, heated air issues from the perforations 41 in the distributor top wall 25, flows through the column pellets or chips 21 and is exhausted from the tank 11 through the conduit 43. Preferably, the dry heated air is discharged from the distributor 23 at the maximum velocity at which no "blow holes" will occur in the column of pellets or chips.

The dried pellets or chips 21 pass inbetween the gas distributor 23 and the tank walls, through the discharge hopper 17 and sleeve 59, into the enclosed conveyor 61. The discharge hopper 17, together with the gas distributor 23 and manifold 33, are rapidly agitated by the vibrators 69 to avoid bridging of particles between the tank and gas distributor.

The spent air removed from the tank 11 is passed by the conduit 45 into a cooler 47 where it is chilled by a fluid circulated therethrough. The desiccant dryer 49 removes moisture from the now cooled air after which the air is again elevated to the desired temperature by the heater 51 and recirculated into the gas distributor by the pump 38.

It is to be understood that changes and variations may be made without departing from the spirit and scope of the invention as defined in the appended claims.

We claim:

1. Apparatus for use in continuous drying of solid particles including walls defining a vertically disposed, closed tank having a discharge hopper at its lowermost end, a flexible, air-tight connection between said discharge hopper and the remainder of said tank, particle delivery means in the vicinity of the uppermost end of said tank, a gas distributor positioned within said tank adjacent to said discharge hopper and in spaced relationship with the walls thereof, said distributor having a perforated conical top wall, means for delivering a heated, dry gas under pressure to said distributor, gas exhaust means in the vicinity of the uppermost end of said tank whereby heated gas delivered to said distributor passes through the perforations in the top wall thereof, flows counter-current to and contacts with particles as they move by gravity toward said discharge hopper, and is removed as spent gas through said exhaust means, and means for vibrating said discharge hopper and distributor to minimize bridging of particles between said gas distributor and the walls of said tank.

2. Apparatus as defined in claim 1 further including gas recirculating means located outwardly of said tank and connected to said gas delivery and exhaust means, said recirculating means including a cooler for chilling spent gas, a dryer for removing moisture from the cooled spent gas, and a heater for reheating the cooled, dried gas.

3. Apparatus as defined in claim 1 further including an enclosed conveyor located outwardly of said tank for receiving dried particles from said discharge hopper and an air tight flexible conduit extending between said discharge hopper and said conveyor which protects the dried particles from the atmosphere outwardly of the tank as they pass from the discharge hopper to the conveyor yet permits vibration of said discharge hopper and gas distributor, said conveyor serving as an airlock which prevents gas from blowing out through said discharge hopper.

4. Apparatus as defined in claim 1 wherein said gas delivery means includes a manifold encircling said tank, a conduit for supplying gas into said manifold, and a plurality of conduits extending from said manifold through said tank walls and opening into said gas distributor at substantially equally spaced intervals thereof.

5. Apparatus as defined in claim 4 wherein said gas distributor includes walls which together with said perforated, conical top wall define a chamber into which open the conduits from said manifold.

6. Apparatus as defined in claim 1 wherein the axes of the perforations in the said gas distributor extend at substantially right angles to the surface of said conical top wall.

References Cited

UNITED STATES PATENTS

| | | | |
|---|---|---|---|
| 3,284,915 | 11/1966 | Berg | 34—164 X |
| 3,328,894 | 7/1967 | Smith, Jr. | 34—57 A |
| 3,353,720 | 11/1967 | Ricciardi | 222—200 |
| 3,533,829 | 10/1970 | Quanquin | 23—284 X |

FOREIGN PATENTS

| | | | |
|---|---|---|---|
| 60,783 | 7/1954 | France | 34—164 |

FREDERICK L. MATTESON, JR., Primary Examiner

R. A. DUA, Assistant Examiner

U.S. Cl. X.R.

23—284; 222—146 H, 1999